US011847727B2

(12) United States Patent
del Val Santos et al.

(10) Patent No.: US 11,847,727 B2
(45) Date of Patent: *Dec. 19, 2023

(54) GENERATING FACIAL POSITION DATA BASED ON AUDIO DATA

(71) Applicant: Electronic Arts Inc., Redwood City, CA (US)

(72) Inventors: Jorge del Val Santos, Stockholm (SE); Linus Gisslen, Stockholm (SE); Martin Singh-Blom, Stockholm (SE); Kristoffer Sjöö, Stockholm (SE); Mattias Teye, Sundbyberg (SE)

(73) Assignee: ELECTRONIC ARTS INC., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/086,237

(22) Filed: Dec. 21, 2022

(65) Prior Publication Data

US 2023/0123486 A1    Apr. 20, 2023

Related U.S. Application Data

(63) Continuation of application No. 17/354,640, filed on Jun. 22, 2021, now Pat. No. 11,562,521, which is a (Continued)

(51) Int. Cl.
*G06T 13/20*     (2011.01)
*G06N 20/20*    (2019.01)
(Continued)

(52) U.S. Cl.
CPC ........... *G06T 13/205* (2013.01); *G06N 3/088* (2013.01); *G06N 20/20* (2019.01); *G06T 13/40* (2013.01)

(58) Field of Classification Search
None
See application file for complete search history.

(56) References Cited

U.S. PATENT DOCUMENTS 10,169,905 B2 * 1/2019 Bhat ................. G06V 40/171
10,262,448 B2 * 4/2019 Bailey .................... G06T 7/20
(Continued)

OTHER PUBLICATIONS

Tero, Karras et al., Audio-Driven Facial Animation by Joint End-to-End Learning of Pose and Emotion, ACM Transactions on Graphics, vol. 36, No. 4, Article 94, Jul. 2017.
(Continued)

*Primary Examiner* — Michael J Cobb
(74) *Attorney, Agent, or Firm* — Gray Ice Higdon

(57) ABSTRACT

A computer-implemented method for generating a machine-learned model to generate facial position data based on audio data comprising training a conditional variational autoencoder having an encoder and decoder. The training comprises receiving a set of training data items, each training data item comprising a facial position descriptor and an audio descriptor; processing one or more of the training data items using the encoder to obtain distribution parameters; sampling a latent vector from a latent space distribution based on the distribution parameters; processing the latent vector and the audio descriptor using the decoder to obtain a facial position output; calculating a loss value based at least in part on a comparison of the facial position output and the facial position descriptor of at least one of the one or more training data items; and updating parameters of the conditional variational autoencoder based at least in part on the calculated loss value.

17 Claims, 5 Drawing Sheets

Related U.S. Application Data continuation of application No. 16/394,515, filed on Apr. 25, 2019, now Pat. No. 11,049,308.

(60) Provisional application No. 62/821,765, filed on Mar. 21, 2019.

(51) Int. Cl.
 *G06T 13/40* (2011.01)
 *G06N 3/088* (2023.01)

(56) References Cited

U.S. PATENT DOCUMENTS

| | | | |
|---|---|---|---|
| 10,402,726 | B1 | 9/2019 | Moore et al. |
| 11,049,308 | B2 | 6/2021 | del Val Santos et al. |
| 2018/0336464 | A1 | 11/2018 | Karras et al. |
| 2019/0122411 | A1 | 4/2019 | Sachs et al. |
| 2019/0347831 | A1 | 11/2019 | Vardhan |
| 2019/0392587 | A1 | 12/2019 | Nowozin et al. |
| 2020/0090049 | A1 | 3/2020 | Aliper et al. |
| 2020/0135226 | A1 | 4/2020 | Mittal et al. |
| 2020/0160201 | A1 | 5/2020 | Katuwal et al. |
| 2020/0233920 | A1 | 7/2020 | Meeds et al. |
| 2020/0242507 | A1 | 7/2020 | Gan et al. |
| 2021/0319610 | A1 | 10/2021 | del Val Santos et al. |
| 2022/0138388 | A1 | 5/2022 | Wang et al. |
| 2022/0156522 | A1 | 5/2022 | Shechtman et al. |

OTHER PUBLICATIONS

Zhou, Yang et al., VisemeNet: Audio-Driven Animator-Centric Speech Animation, ACM Transactions on Graphics, Retrieved from: https://arxiv.org/pdf/1805.09488.pdf, May 24, 2018.

Pham, Hai et al., End-to-end Learning for 3D Facial Animation from Speech, ICMI, Retrieved from: http://www.research.cs.rutgers.edu/~hxp1/rc_images/haipham_speechend2end_icmi2018.pdf, Oct. 16, 2018.

Edwards, Pif et al., JALI: An Animator-Centric Viseme Model for Expressive Lip Synchronization, ACM, Siggraph Technical Paper, Retrieved from: http://www.dgp.toronto.edu/~elf/JALISIG16.pdf, Jul. 24, 2016.

Kingma, Diederik P. et al., Auto-Encoding Variational Bayes, arXiv:1312.6114v10 [stat.ML], Retrieved from: https://arxiv.org/pdf/1312.6114.pdf, May 1, 2014.

Van Den Oord, Aaron et al., Neural Discrete Representation Learning, 31st NIPS Conference 2017, Retrieved from: https://arxiv.org/pdf/1711.00937.pdf, May 30, 2018.

Taylor, Sarah et al., A Deep Learning Approach for Generalized Speech Animation, ACM Transactions on Graphics, vol. 36, No. 4, Article 93, Jul. 2017.

Jamaludin, Amir et al., You Said That?: Synthesising Talking Faces from Audio, International Journal of Computer Vision, pp. 1-13, Retrieved from: https://rd.springer.com/article/10.1007/s11263-019-01150-y, Feb. 13, 2019.

Zhou, Hang et al., Talking Face Generation by Adversarially Disentangled Audio-Visual Representation, arXiv:1807.07860v1 [cs.CV], Retrieved from: https://arxiv.org/pdf/1807.07860v1.pdf, Jul. 20, 2018.

Vougioukas, Konstantinos et al., End-to-End Speech-Driven Facial Animation using Temporal GANs, arXiv:1805.09313v4 [eess.AS], Retrieved from: https://arxiv.org/pdf/1805.09313.pdf, Jul. 19, 2018.

Suwajanakorn, Supasorn et al., Synthesizing Obama: Learning Lip Sync from Audio, ACM Transactions on Graphics, vol. 36, No. 4, Article 95, Jul. 2017.

Fan, Bo et al., Photo-Real Talking Head with Deep Bidirectional LSTM, Retrieved from: https://www.microsoft.com/en-us/research/wp-content/uploads/2015/04/icassp2015_fanbo_1009.pdf, 2015.

Sadoughi, Najmeh et al., Speech-Driven Expressive Talking Lips with Conditional Sequential Generative Adversarial Networks, arXiv:1806.00154v1 [cs.HC], Retrieved from: https://arxiv.org/pdf/1806.00154.pdf, Jun. 1, 2018.

Taylor, Sarah et al., Audio-to-Visual Speech Conversion using Deep Neural Networks, Interspeech, Retrieved from: https://pdfs.semanticscholar.org/1ba3/84ef80ab9295162833ed2658aac119fe9cc3.pdf?_ga=2.248395783.1678775272.1557499301-327079392.1549473502, Sep. 8, 2016.

Duarte, Amanda et al., WAV2PIX: Speech-Conditioned Face Generation Using Generative Adversarial Networks, IEEE, Retrieved from: https://arxiv.org/pdf/1903.10195.pdf, Mar. 25, 2019.

Tzirakis, Panagiotis et al., Synthesising 3D Facial Motion from "In-the-Wild" Speech, arXiv:1904.07002v1 [cs.CV], Retrieved from: https://arxiv.org/pdf/1904.07002v1.pdf, Apr. 15, 2019.

Holden, Daniel et al., A New Era of Performance Capture with Machine Learning, Game Developers Conference, GDS Vault, Retrieved from: https://www.gdcvault.com/play/1026328/A-New-Era-of-Performance, Mar. 18, 2019.

David Greenwood, Iain Matthews, Stephen Laycock, Joint Learning of Facial Expression and Head Pose from Speech, 2018, Proceedings of Interspeech 2018, p. 1-5, Doi: 10.21437/Interspeech.2018-2587 (Year: 2018).

Sara Dahmani, Vincent Colotte, Valerian Girard, Slim Ouni, Conditional Variational Auto-Encoder for Text Driven Expressive AudioVisual Speech Synthesis, 2019, Interspeech 2019—20th Annual Conference of the International Speech Communication Association, hl-02175776, p. 1-5 (Year: 2019).

Gaurav Mittal and Baoyuan Wang, "Animating Face using Disentangled Audio Representations," 2020, 2020 IEEE Winter Conference on Application of Computer Vision (WACV), p. 3279-3287, Doi: 10.1109/WACV45572.2020.9093527 (Year: 2020).

Carl Eduard Rasmussen, Christopher K.I. Williams, Gaussian Processes for Machine Learning, the MIT Press, 2006, ISBN 026218253X. Retrieved from <<http://www.gaussianprocess/org/gpml/chapters/RW2.pdf>>, Access Aug. 16, 2020 (Year: 2006).

Scikit-learn, "1.7. Gaussian Processes," 2020, retrieved from <<https://scikit-learn.org/stable/modules/gaussian_process.html>>, Access Aug. 16, 2020 (Year: 2020).

Greenwood David, Predicting Head Pose from Speech, 2018, Doctor of Philosophy, University of Each Anglia, United Kingdom, pp. 1-211 (Year: 2018).

Greenwood David, Stephen Laycock, Iain Matthews, Predicting Head Pose from Speech with a Conditional Variational Autoencoder, 2017, Interspeech 2017, pp. 3991-3995 (Year: 2017).

Kihyuk Sohn, & Honglak Lee, and Xinchen Yan, "Learning Structured Output Representation using Deep Conditional Generative Models," 2018, Advances in Neural Information Procesing Systems 28 (NIPS 2015), retrieved from <<https://papers.nips.cc/book/advances-in-neural-information-processing-systems-28-2015>>.

Konstantinos Vougioukas, Stavros Petridis, Maja Pantic, "Realistic Speech-Driven Facial Animation with GANs", 2019, International Journal of Computer Vision, 128:1398-1413. (Year: 2019).

\* cited by examiner

GENERATING FACIAL POSITION DATA BASED ON AUDIO DATA

FIELD OF THE INVENTION

This specification relates to generating facial position data based on audio data.

BACKGROUND

Animation tools for computer facial animation are used in video game development to animate images or models of a character's face, for example to animate a character's facial movements during speech. Techniques have been developed to animate speech based on audio data, for example based on visemes, the visual counterpart of phonemes. One difficulty with viseme-based techniques is that the co-articulation rules on which they are based are typically quite complicated.

SUMMARY

In accordance with a first aspect, this specification describes a computer-implemented method for generating a machine-learned model to generate facial position data based on audio data. The method includes training a conditional variational autoencoder having an encoder and decoder. The training of the conditional variational autoencoder includes: receiving a set of training data items, wherein each of the training data items includes a facial position descriptor representative of the position of facial elements associated with a time step, and an audio descriptor representative of audio data associated with the time step; processing one or more of the training data items using the encoder to obtain latent space distribution parameters; sampling a latent vector from a latent space distribution based on the latent space distribution parameters; processing the latent vector and the audio descriptor using the decoder to obtain a facial position output; calculating a loss value based at least in part on a comparison of the facial position output and the facial position descriptor of at least one of the one or more training data items; and updating parameters of the conditional variational autoencoder based at least in part on the calculated loss value.

In accordance with a second aspect, the specification describes a computer-implemented method for generating facial position data based on audio data. The method includes receiving an audio descriptor representative of audio data associated with a time step; receiving a latent vector; and processing the latent vector and the audio descriptor using a decoder of a trained conditional variational autoencoder to obtain a facial position output.

In accordance with a third aspect, the specification describes a system including an audio transformer, a latent vector provider, a rig parameter generator and animation software. The audio transformer is configured to receive audio data; process the audio data to obtain transformed audio data including a plurality of audio descriptors, each audio descriptor representative of a time step of the audio data; and output the transformed audio data. The latent vector provider is configured to provide one or more latent vectors. The rig parameter generator includes a machine-learned model and is configured to receive the transformed audio data; receive the provided one or more latent vectors; process the transformed audio data and the provided one or more latent vectors using the machine-learned model; and generate one or more rig parameters for positioning a skeleton of a three-dimensional facial model. The animation software is configured to animate the three-dimensional facial model based on the one or more rig parameters.

BRIEF DESCRIPTION OF THE DRAWINGS

Certain embodiments of the present invention will now be described, by way of example, with reference to the following figures.

DETAILED DESCRIPTION

Example implementations provide system(s) and methods for the training and use of a machine-learned model to generate facial positions based on audio data.

Figure 1:
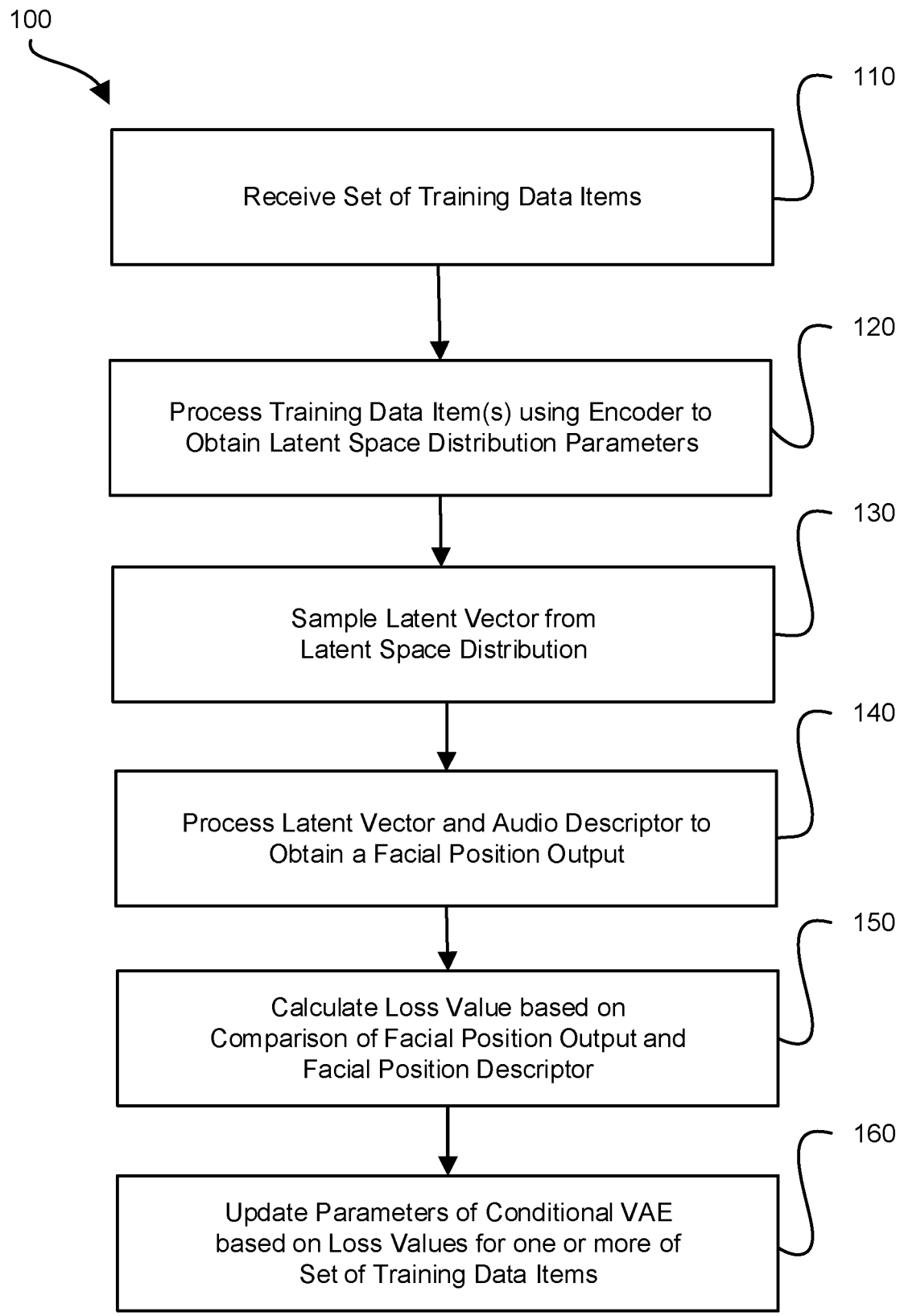
FIG. 1 is a flow diagram of an example method for training a conditional variational autoencoder for use in generating a machine-learned model to generate facial position data based on audio data.

FIG. 1 is a flow diagram illustrating an example method 100 of training a conditional variational autoencoder for use in generating a machine-learned model to generate facial position data based on audio data. This is intended as an example and other methods may be used instead. The method is performed by executing computer-readable instructions using one or more processors of one or more computing devices.

In step 110, a set of training data items is received. Each of the training data items may include a facial position descriptor and one or more audio descriptors. Each of the training data items may also include additional descriptors and/or parameters. For example, one or more descriptors indicating an actor associated with the one or more audio descriptors and/or one or more descriptors indicating a character associated with the facial positions may be included. The training data items may be received using any appropriate mechanism. For example, the training data items may be received from a storage system, e.g. a hard disk drive or solid state drive; via an application programming interface (API); via a network service call; via interprocess communication (IPC) and/or by reading shared system memory.

Each of the facial position descriptors may represent one or more positions of facial elements associated with a time step, e.g. the position of the face during the time step. Each facial position descriptor may include one or more rig parameters for positioning a skeleton of a three-dimensional facial model. The one or more rig parameters may describe the positions and/or orientations of interconnected bones forming the skeleton of the three-dimensional facial model. The skeleton may be a hierarchical set of joint objects used to represent more complex structures to drive deformation of a three-dimensional facial mesh. The one or more rig parameters may include one or more of the following parameter types: joint parameters, where a joint is a representation of a point in 3D space with the parameters defining a transform that is used to deform a mesh; blendshape parameters, where a blendshape is a set of delta position offsets for a subset of vertices making up a mesh; and controller node parameters, where a controller might be a single numeric attribute that drives multiple outputs. For example, the numerical attribute may be shown by a slider and control both a joint rotation and a blendshape weight value. The numerical attribute may have a value between 0.0 and 1.0 which is mapped on to a joint rotation range of between −45 and +45 degrees and a blendshape weight range of between 100 and 0.

The facial position descriptors may also take other forms. For example, the facial position descriptors may include a plurality of vertex positions of the three-dimensional facial model. The plurality of vertex positions may be received as vertex coordinates or as displacements of the vertices from their positions in a template facial mesh.

Each of the audio descriptors may be representative of audio data associated with a time step. The audio data associated with the time step may be a window of speech audio. Each audio descriptor may include a spectral representation of the audio data. The spectral representation may be a representation of the short-term power spectrum of the audio data. The representation may be based on a linear cosine transform of the logarithm of the power spectrum on a non-linear mel frequency scale. The spectral representation of the audio data may include a plurality of mel-frequency cepstral coefficients (MFCC). Deriving the MFCC may include taking the Fourier transform of the audio data; mapping the obtained spectral powers onto the mel scale; taking the logarithms of the spectral powers at each mel frequency; and taking the discrete cosine transform of these logarithms. The audio descriptor may additionally or alternatively include one or more other representations of the audio data. For example, the audio descriptor may include perceptual linear prediction speech features; filter bank features; and/or Gammatone Frequency Cepstral Coefficients (GFCC).

Each of the audio descriptors may alternatively or additionally include one or more representations of the audio data produced by an audio processing neural network. Spectral representations of the audio data, e.g. MFCC representations, may be used as an input to the audio processing neural network. The audio processing neural network may be any suitable neural network and include any or any combination of feed-forward layers; recurrent layers; and/or convolutional layers. The audio descriptors may be produced by an encoder network of a Vector Quantized-Variational Autoencoder (VQ-VAE). The VQ-VAE may be trained based on a set of audio data which may include audio data represented by at least a subset of the audio descriptors. The training of the VQ-VAE may be prior to and/or concurrent with the training of the conditional variational autoencoder. For example, the VQ-VAE may be pre-trained prior to the training of the conditional variational autoencoder, but be fine-tuned, i.e. continue its training, with the training of the conditional variational autoencoder. The VQ-VAE may be a conditional VQ-VAE. For example, the conditional VQ-VAE may be conditioned on information about the character or user which produced the audio data, i.e. speaker details. The representations of audio data produced by an encoder VQ-VAE may generalize better than other representations of audio data. Furthermore, conditioning the VQ-VAE on speaker details may facilitate the production of representations which extract details of the speech which are independent of the speaker.

Returning to FIG. 1, in step 120 of the method 100, one or more of the training data items are processed using the encoder of the conditional variational autoencoder to obtain latent space distribution parameters. The facial position descriptor may be input to the first layer of the encoder. The audio descriptor may be input to one or more subsequent layers of the encoder. Alternatively, the facial position descriptor, or a part thereof, and the audio descriptor, or a part thereof, may be concatenated, or otherwise combined, and fed into the first layer of the encoder. One or more additional parameters and/or descriptors may also be input to the encoder, e.g. information about the actor who produced the audio. Each of the training data items may be input to the encoder and processed using neural network layers of the encoder. The neural network layers of the encoder may be feed-forward layers. Feed-forward layers may use fewer computational resources and/or process the training data items faster than other types of neural network layers. However, in some embodiments, other types of neural network layers may alternatively or additionally be used such as recurrent layers and/or convolutional layers. The latent space distribution parameters output by the encoder may include a location vector, i.e. a mean vector; and a standard deviation or variance vector. Alternatively or additionally, the latent space distribution parameters may include a covariance matrix, Dirichlet distribution concentration parameters and/or a degree of freedom parameter.

In one example, a training data item includes a facial position descriptor in the form of a vector of parameters and a audio descriptors in matrix form, the audio descriptors representing slightly overlapping windows of audio, surrounding the time step associated with the facial position descriptor. The facial position descriptor is passed through a fully connected layer that maps it to a k-dimensional vector, F. The a audio descriptors are passed through convolutional layers that increase their number of channels, i.e. their depth, but decreases their width and height. For each of the a audio descriptors, an l-dimensional vector is output by the convolutional layers. These a vectors are processed using one or more recurrent layers to output a single l-dimensional vector, A, representing the audio descriptors. The vectors F and A are concatenated into a (k+l)-dimensional vector, FA. The vector FA is processed by one or more fully connected layers which map it to a 2n dimensional vector representing the latent space distribution parameters. The first n dimensions of this vector are the predicted mean vector of the latent space distribution parameters and the last n dimensions are the predicted diagonal of the standard deviation matrix.

In step 130, a latent vector, z, is sampled from a latent space distribution based on the latent space distribution parameters. Where the latent space distribution parameters include a location vector, $\mu$, and a variance vector, $\sigma^2$, the latent space distribution may be a multivariate Gaussian distribution having a location defined by the location vector and a diagonal covariance matrix, $\Sigma_d$, with a diagonal of the variance vector, $\sigma^2$:

$$z \sim \mathcal{N}(\mu, \Sigma_d)$$

Where the latent space distribution parameters include a location vector, $\mu$, and a covariance matrix, $\Sigma$, the latent space distribution may be a multivariate Gaussian distribution having a location defined by the location vector and a covariance defined by the covariance matrix:

$$z \sim \mathcal{N}(\mu, \Sigma)$$

Other latent space distributions may alternatively be used. The latent space distribution parameters may include a degree of freedom parameter, ν, and the latent space distribution may be a multi-variate t-distribution parameterized with either a variance vector or covariance matrix:

$$z \sim t_\nu(\mu, \Sigma_d) \text{ or } z \sim t_\nu(\mu, \Sigma)$$

Alternatively, the latent space distribution parameters may be a vector, a, of positive real numbers known as concentration parameters, and the latent space distribution may be a Dirichlet distribution:

$$z \sim \text{Dir}(\alpha)$$

Where a multivariate Gaussian distribution is used, the latent vector, z, may be sampled by sampling a (pseudo-)randomly distributed vector, ε, from the zero-mean, unit-variance multi-variate Gaussian distribution, $\mathcal{N}(0, \mathbb{I})$, and using this to calculate a value for the latent vector, z, using latent space distribution parameters:

$$z = \mu + \sigma \varepsilon \text{ where } \varepsilon \sim \mathcal{N}(0, \mathbb{I})$$

where μ is the location vector and σ is the standard deviation vector. Alternatively, where a covariance matrix, Σ, is used, a value for the latent vector may be calculated as $$z = \mu + \sum\nolimits^{\frac{1}{2}} \varepsilon$$

where $$\sum\nolimits^{\frac{1}{2}}$$

is the Cholesky decomposition of the covariance matrix.

This technique is known as the reparametization trick. A benefit of the reparametization trick is that the stochastic element is the (pseudo-)randomly distributed vector, ε, and, therefore, during training of the network, the latent space distribution parameters, e.g. μ and σ, may be backpropagated through the network.

In step 140, the latent vector and the audio descriptor are processed using the decoder to obtain a facial position output. The latent vector may be input to the first layer of the decoder. The audio descriptor may be input to one or more subsequent layers of the decoder. Alternatively, the latent vector and audio descriptor, or a part thereof, may be concatenated and input into the first layer of the decoder as a combined vector. One or more additional parameters and/or descriptors may also be input to the decoder, e.g. information about the actor who produced the audio. The inputs may be processed using neural network layers of the decoder. The neural network layers of the decoder may be feed-forward layers. Feed-forward layers may use fewer computational resources and/or process the training data items faster than other types of neural network layers. However, in some embodiments, other types of neural network layers may alternatively or additionally be used such as recurrent layers and/or convolutional layers. The decoder may have the same number of neural network layers as the encoder. Aspects of the decoder and encoder networks may correspond. For example, the output layer of the decoder may be the same size as the input layer of the encoder; the second to last layer of the decoder may be the same size as the second layer of the encoder; and/or the input layer of the encoder may be the same size as the output layer of the encoder, etc.

In one example, the latent vector; a audio descriptors in matrix form, the audio descriptors representing slightly overlapping windows of audio; an n-dimensional latent vector, Z; and an actor descriptor, in the form of a m-dimensional one-hot encoded vector, C, where m corresponds to the number of actors in the training set, are processed by the decoder. The latent vector and the actor descriptor are concatenated to give a (n+m)-dimensional vector, ZC. The a audio descriptors are passed through convolutional layers that increase their number of channels, i.e. their depth, but decreases their width and height. For each of the a audio descriptors, an l-dimensional vector is output by the convolutional layers. These a vectors are processed using one or more recurrent layers to output a single l-dimensional vector, A, representing the audio descriptors. The vectors ZC and A are concatenated into a (n+m+l)-dimensional vector, ZCA. The vector ZCA is processed by one or more fully connected layers which map it to a k-dimensional vector, the number of parameters in the face descriptor vector, each of the elements of the vector corresponding to a parameter of the face descriptor input to the network.

The facial position output may be in the same form as the facial position descriptors. The facial position output may include one or more rig parameters for positioning a skeleton of a three-dimensional facial model. The one or more rig parameters may describe the positions and/or orientations of interconnected bones forming the skeleton of the three-dimensional facial model. The facial position output may also take other forms. For example, the facial position output may include a plurality of vertex positions of the three-dimensional facial model. The plurality of vertex positions may be received as vertex coordinates or as displacements of the vertices from their positions in a template facial mesh.

In step 150, a loss value is calculated based at least in part on a comparison of the facial position output and the facial position descriptor of at least one of the one or more training data items. The loss value may be calculated using a loss function including a reconstruction error term and a regularization term. The loss value may be calculated individually for corresponding facial position descriptors and facial position outputs or may be calculated as a mean or sum over a plurality of corresponding facial position descriptors and facial position outputs.

The reconstruction error term may be based on the mean squared error between the facial position output and the facial position descriptor. Alternatively or additionally, the reconstruction error term may be based on other measures of reconstruction error such as mean absolute error or root mean squared error.

The regularization term may be based on a Kullback-Leibler divergence between an estimated posterior distribution of the latent vector, i.e. the latent space distribution determined by the encoder based on the facial position descriptor and the audio descriptor, and a prior distribution for the latent vector. As described previously, the estimated posterior distribution may be a multivariate Gaussian distribution, $\mathcal{N}(\mu, \Sigma)$, where μ and Σ are parameters derived using the encoder. Σ may be derived directly by the encoder or a variance vector, $\sigma^2$, or standard deviation vector, σ, may be derived using the encoder, and the covariance matrix, Σ, defined as a diagonal covariance matrix with a diagonal of the variance vector, $\sigma^2$.

The prior distribution of the latent vector may be a zero-mean unit variance multivariate Gaussian distribution, $\mathcal{N}(0, \mathbb{I})$. The estimated posterior distribution of the latent vector may be denoted as Q(z|x, s) where z is the latent vector, x is a vector of rig parameters and s is the audio descriptor or a vector representation thereof. The estimated posterior distribution may be conditioned on additional input parameters and/or descriptors, e.g. an actor descriptor. If the additional input parameters are denoted as a vector, c, the estimated posterior distribution of the latent vector can be denoted as Q(z|x, s, c). The prior distribution of the latent vector may be denoted as P(z). Where the estimated posterior and prior distributions are the described multi-variate Gaussians, the Kullbeck-Leibler divergence between these, $\mathcal{D}$ (Q(z|x, s)||P(z)), may be calculated as:

$$\mathcal{D}_{(Q(z|x,s)\|P(z))} = \mathcal{D}(\mathcal{N}_{(\mu,\Sigma)} \| \mathcal{N}_{(0,\mathbb{I})}) = \tfrac{1}{2}(tr(\Sigma) + \mu^T\mu - k - \log|\Sigma|)$$

where k is the dimensionality of z, i.e. the number of elements in the latent vector.

Additional terms may be included in the loss function. For example, the loss function may include additional regularization terms, such as an L2 regularization term and/or an L1 regularization term.

In step 160, the parameters of the conditional variational autoencoder are updated based at least in part on the calculated loss value. The updates to the parameters may be calculated using backpropagation. In backpropagation, the calculated loss value, or a value derived from it, are backpropagated through the network to calculate derivatives of the loss with respect to a given network parameter of the conditional variational autoencoder, e.g. network weights. The parameters of the conditional variational autoencoder may then be updated by gradient descent using the calculated derivatives. As discussed above, the 'reparametization trick' may facilitate the use of gradient descent to train the network. With the reparametization trick, the layer of the network calculating the latent vector may be backpropagated through to the encoder via deterministic latent space distribution parameters, with the stochastic element contained in the sampled vector, E.

Training the conditional variational autoencoder may involve performing multiple iterations of the above steps until one or more criteria are met, e.g. one or more performance metrics are met. For example, training may continue until the loss value is approximately constant for a number of iterations and/or is below a given threshold loss value.

Facial Position Data Generation Method

Figure 2:
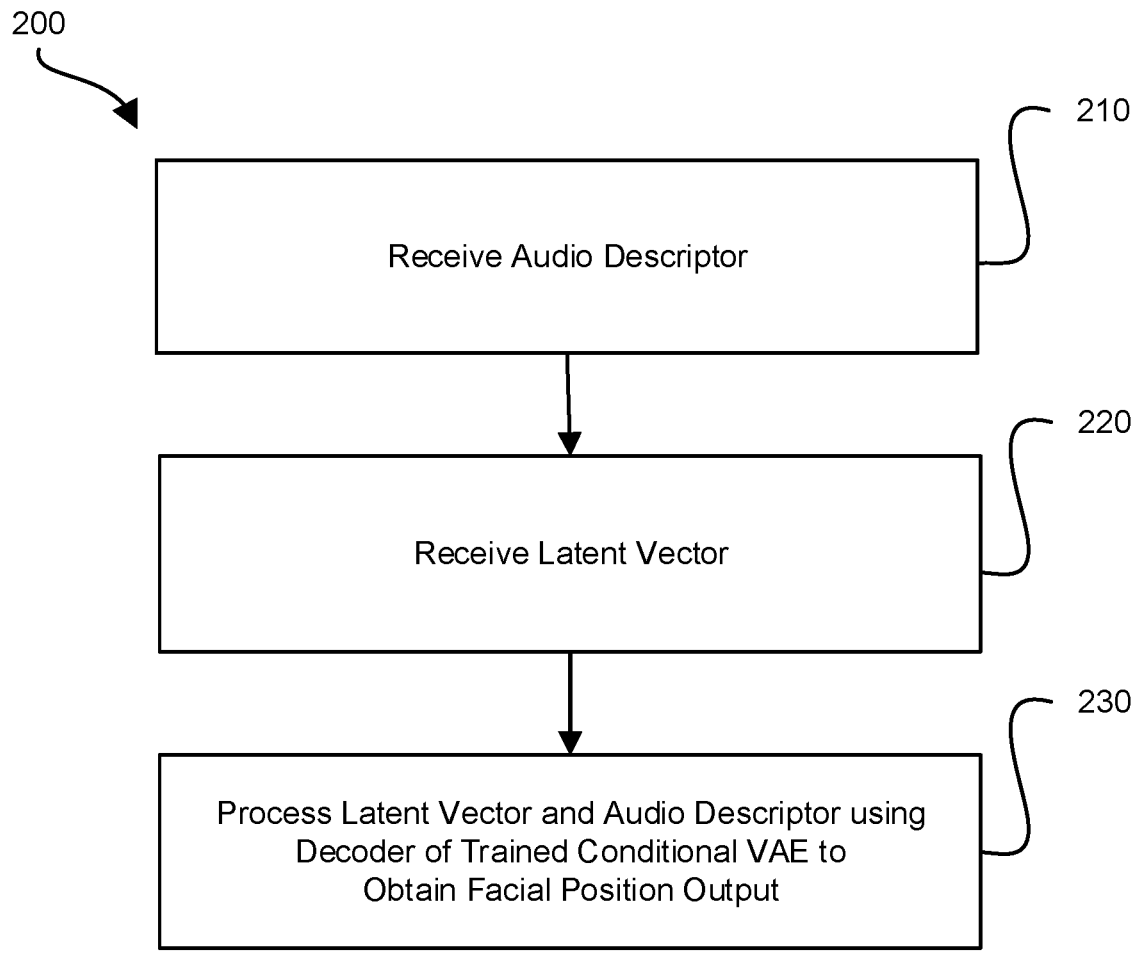
FIG. 2 is a flow diagram of an example method for generating facial position data based on audio data.

FIG. 2 is a flow diagram illustrating an example method 200 for generating facial position data based on audio data. This is intended as an example and other methods may be used instead. The method is performed by executing computer-readable instructions using one or more processors of one or more computing devices.

In step 210, an audio descriptor representative of audio data associated with a time step is received. The audio data associated with the time step may be a window of speech audio. The audio descriptor may include a spectral representation of the audio data, e.g. any of the spectral representations of audio data described above. For example, the spectral representation of the audio data may include a plurality of mel-frequency cepstral coefficients. Alternatively or additionally, the audio descriptor may include one or more representations of the audio data produced by a neural network, e.g. any of the representations of audio data derived using an audio processing neural network described above. For example, the representation of audio data may be the output of an encoder of a vector quantized variational autoencoder for the audio data associated with the time step.

In step 220, a latent vector is received. The received latent vector may be a pre-determined latent vector value and may be retrieved from memory and/or a storage system. The latent vector may also be input by a user via a user input mechanism. The user input mechanism may be a command line interface, a scripting interface or a graphical user interface. Where the user input mechanism is a graphical user interface, inputting the latent vector may include selecting a facial image associated with the latent vector. The latent vector may also be generated based on one or more received facial expression parameters. The one or more facial expression parameters may correspond with intelligible aspects of facial expressions and may be transformed using a suitable transformation to a suitable latent vector. For example, a suitable latent vector may be derived using the encoder to transform a given facial descriptor to an associated latent vector, with the associated latent vector being the mean of the output distribution given by the encoder.

Alternatively, the received latent vector may be sampled from a Gaussian process. The latent vector may be sampled from the Gaussian process by deriving a distribution using Gaussian process regression on one or more latent vectors associated with one or more time steps prior to the time step associated with the audio data and/or a number of set latent vector values for one or more time steps after the time step associated with the audio data. The latent vector may then be sampled from the derived distribution. After sampling, the latent vector may be fixed for future time steps of the animation or part thereof, or a new latent vector may be sampled from the latent vector each time, or at specific intervals, e.g. a latent vector may be sampled for every 1000 time steps and between these time steps the latent vector for may be linearly interpolated.

The latent vector may also be generated based on one or more latent vectors associated with one or more time steps prior to the time step associated with the audio data using other methods. For example, the latent vector may be generated using a random walk from the one or more latent vectors associated with the previous time steps. The latent vector may also be generated based on one or more set latent vectors associated with one or more previous time steps and one or more set latent vectors associate with one or more future time steps. For example, the latent vector may be an interpolation between a set latent vector associated with a previous time step and a set latent vector associated with a later time step.

In step 230, the latent vector and the audio descriptor are processed using a decoder of a trained conditional variational autoencoder to obtain a facial position output. The trained conditional variational autoencoder may have been trained according to the method described in relation to FIG. 1.

The received latent vector may be input to the first layer of the decoder. The received audio descriptor may be input to one or more subsequent layers of the decoder. Alternatively, the received latent vector and received audio descriptor, or a part thereof, may be concatenated and input into the first layer of the decoder as a combined vector. One or more additional parameters and/or descriptors may also be input to the decoder, e.g. information about the actor who produced the audio. The inputs may be processed using neural network layers of the decoder. The neural network layers of the decoder may be feed-forward layers. Feed-forward layers may use fewer computational resources and/or process the training data items faster than other types of neural network layers. However, in some embodiments, other types of neural network layers may alternatively or additionally be used such as recurrent layers and/or convolutional layers. As an example, the decoder may have the structure described above in relation to step 140 of FIG. 1.

The facial position output may include one or more rig parameters for positioning a skeleton of a three-dimensional facial model. The one or more rig parameters may describe the positions and/or orientations of interconnected bones forming the skeleton of the three-dimensional facial model. The facial position output may also take other forms. For example, the facial position output may include a plurality of vertex positions of the three-dimensional facial model. The plurality of vertex positions may be received as vertex coordinates or as displacements of the vertices from their positions in a template facial mesh.

Facial Animation System

Figure 3:
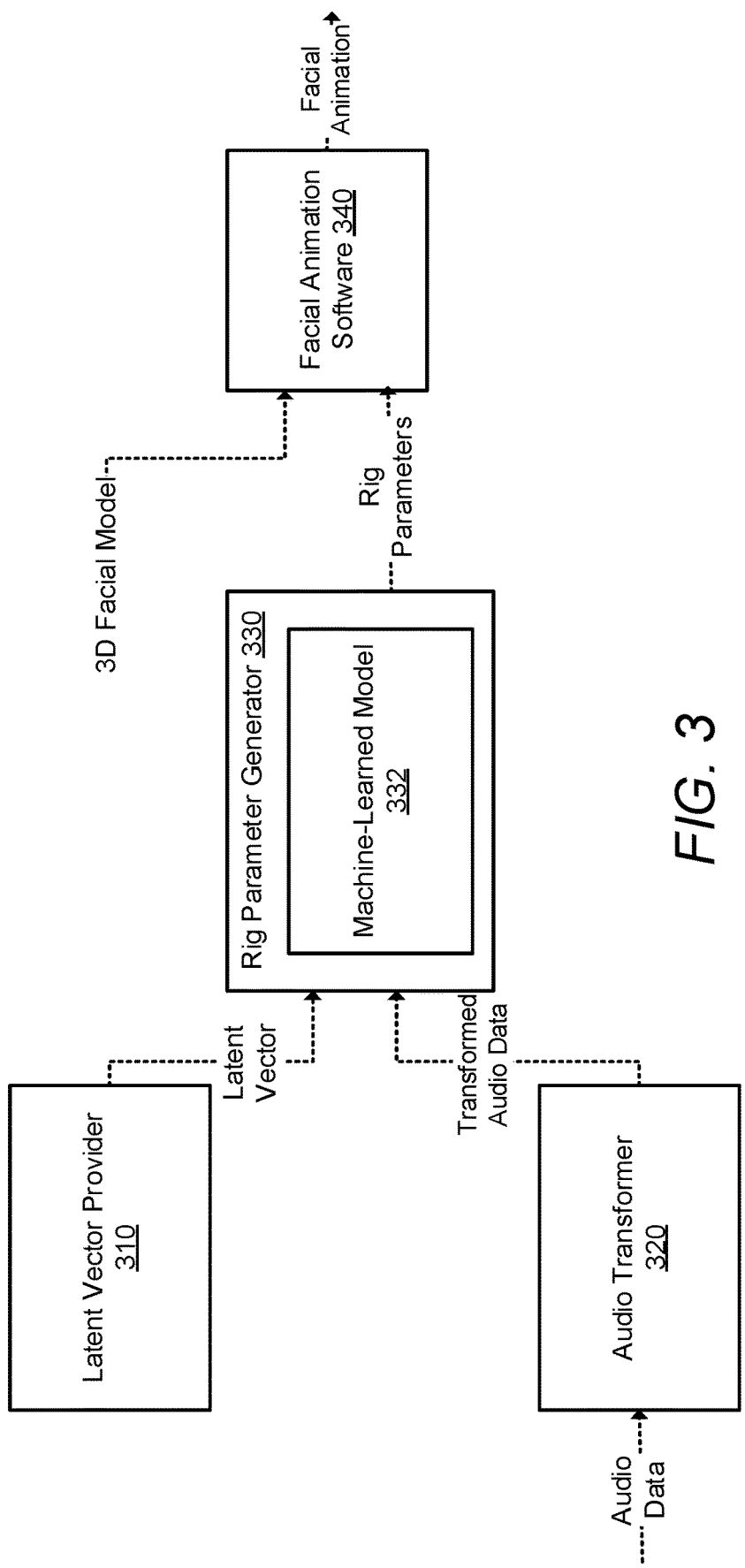
FIG. 3 is a schematic block diagram illustrating an example of a system where a three dimensional facial model may be animated based on audio data.

Referring to FIG. 3, an example facial animation system 300 is described.

The facial animation system 300 includes a latent vector provider 310, an audio transformer 320, a rig parameter generator 330 and facial animation software 340.

The latent vector provider 310 is configured to provide one or more latent vectors. The latent vector provider may provide the rig parameter generator 330 with the one or more latent vectors via any suitable communication mechanism, e.g. via an application programming interface (API); via a function call; via a network service call; via interprocess communication (IPC) and/or by writing to shared system memory.

To provide the one or more latent vectors, the latent vector provider 310 may retrieve one or more latent vectors from memory and/or a storage system. The retrieved latent vectors may have been generated and/or selected prior to the provision of the latent vectors. The provided one or more latent vectors may be the retrieved one or more latent vectors.

The latent vector provider 310 may be configured to receive one or more user inputs and to generate the one or more provided latent vectors based on the received user input. The latent vector provider 310 may receive the one or more user inputs via a user input mechanism. The user input mechanism may be a command line interface, a scripting interface or a graphical user interface. Where the user input mechanism is a graphical user interface, the latent vector may be generated based on a selection of a facial image associated with the latent vector. The one or more provided latent vectors may also be generated based on one or more received facial expression parameters. The one or more facial expression parameters may correspond with intelligible aspects of facial expressions and may be transformed using a suitable transformation, e.g. a matrix multiplication, to one or more latent vectors.

The latent vector provider 310 may generate the one or more provided latent vectors by sampling the latent vector from a Gaussian process. The provided latent vector may be sampled from the Gaussian process by deriving a distribution using Gaussian process regression on one or more latent vectors associated with one or more time steps prior to the time step associated with the audio data and/or a number of set latent vector values for one or more time steps after the time step associated with the audio data. The one or more provided latent vectors may then be sampled from the derived distribution.

The latent vector may also be generated based on one or more latent vectors associated with one or more time steps prior to the time step associated with the audio data using other methods. For example, the latent vector may be generated using a random walk from the one or more latent vectors associated with the previous time steps. The latent vector may also be generated based on one or more set latent vectors associated with one or more previous time steps and one or more set latent vectors associated with one or more future time steps. For example, the latent vector may be an interpolation between a set latent vector associated with a previous time step and a set latent vector associated with a later time step.

The audio transformer 320 is configured to receive audio data, process the received audio data to obtain transformed audio data and output the transformed audio data. The transformed audio data includes a plurality of audio descriptors. Each audio descriptor may be representative of a time step of the audio data, e.g. a window of speech audio.

The audio transformer 320 may derive spectral representations of the audio data time steps. The spectral representations may be included in the respective audio descriptor. The spectral representation may be a representation of the short-term power spectrum of the audio data time step. The audio transformer 320 may derive the spectral representation with method including taking a linear cosine transform of the logarithm of the power spectrum on a non-linear mel frequency scale. The spectral representation of the audio data time step may include a plurality of mel-frequency cepstral coefficients (MFCC). The audio transformer 120 may derive the MFCC by a method including taking the Fourier transform of the audio data; mapping the obtained spectral powers onto the mel scale; taking the logarithms of the spectral powers at each mel frequency; and taking the discrete cosine transform of these logarithms. The audio descriptor may additionally or alternatively include one or more other representations of the audio data derived by the audio transformer 120. For example, the audio descriptor may include perceptual linear prediction speech features; filter bank features; and/or Gammatone Frequency Cepstral Coefficients (GFCC).

Alternatively or additionally, the audio transformer 320 may include an audio processing neural network (not shown). The audio processing neural network may process the audio data time steps to produce corresponding representations of the audio data. The representations produced for the audio data time steps by the neural network may be included in the respective audio descriptor. The audio processing neural network may be any suitable neural network and include any or any combination of feed-forward layers; recurrent layers; and/or convolutional layers. The audio processing neural network may be an encoder network of a Vector Quantized-Variational Autoencoder (VQ-VAE). The VQ-VAE may be trained based on a set of audio data which may include audio data represented by at least a subset of the audio descriptors. The VQ-VAE may be a conditional VQ-VAE. For example, the conditional VQ-VAE may be conditioned on information about the character or user which produced the audio data, i.e. speaker details. The representations of audio data produced by an encoder VQ-VAE may generalize better than other representations of audio data. Furthermore, conditioning the VQ-VAE on speaker details may facilitate the production of representations which extract details of the speech which are independent of the speaker.

The rig parameter generator 330 includes a machine-learned model 322. The rig parameter generator 330 is configured to receive the provided one or more latent vectors from the latent vector provider 310; receive the transformed audio data from the audio transformer 320; process the transformed audio data and the provided one or more latent vectors using the machine-learned model; and generate one or more rig parameters for positioning a skeleton of a three-dimensional facial model. The rig parameter generator 330 may generate a plurality of sets of rig parameters. For example, the rig parameter generator may generate a set of rig parameters for each time step of the audio data. The rig parameter generator 330 may also receive additional parameters and/or descriptors, e.g. information about the actor who produced the audio.

The machine-learned model 332 is configured to process the transformed audio data and the provided one or more latent vectors. The transformed audio data may be input to the machine-learned model 332 as a series of vectors, matrices, tensors or in other similar data structures, and may be input to one or more layers of the machine-learned model other than the first layer. The one or more latent vectors may be input to the machine-learned model 332 as a series of vectors. The one or more latent vectors may be input to a first layer of the machine-learned model 332. Each vector may be a concatenation, or other suitable combination, of one of the one or more latent vectors and one of the audio descriptors included in the transformed audio data. One or more additional parameters and/or descriptors may also be input to the machine-learned model 332, e.g. information about the actor who produced the audio. In response to receiving the one or more latent vectors and the transformed audio data, the machine-learned model may process the vector(s) to generate one or more rig parameters for positioning a skeleton of a three-dimensional facial model. Alternatively, the machine-learned model 332 may output one or more values that may be transformed to rig parameters by the rig parameter generator 330, e.g. using a linear or non-linear transformation function.

The machine-learned model 332 may include a neural network. The neural network may include a plurality of neural network layers. The neural network layers may be feed-forward layers; recurrent layers and/or convolutional layers. The neural network may be a generative neural network. For example, the neural network may be a decoder network of a trained conditional variation encoder, e.g. a neural network trained according to the method described in related to FIG. 1, and/or a generator of a trained conditional generative adversarial network.

The facial animation software 340 is configured to animate the three-dimensional facial model based on the one or more rig parameters. The three-dimensional facial model may include a plurality of geometric primitives, e.g. vertices and edges. For example, the three-dimensional facial model may be a textured facial mesh. The three-dimensional facial model may be animated by positioning at least a subset of the geometric primitives based on the one or more rig parameters. Where the one or more rig parameters are a plurality of sets of rig parameters for each time step of the audio data, the facial animation software 340 may play or cause playing of the audio data, and animate the three-dimensional facial model by positioning the face based on the respective set of rig parameters during a time associated with the respective time step of the audio data, e.g. when that time step of the audio is being played or being caused to be played. The facial animation software 340 may be any of a 3D computer graphics application, a 3D animation renderer or a 3D games engine.

Further to the components described above, the facial animation system 300 may include a text-to-speech module (not shown) which is configured to receive one or more texts and generate the audio data based on the received text. This audio data may be received by the audio transformer 320. The text-to-speech module may include a machine-learned model, e.g. a text-to speech neural network. In some embodiments, the text-to speech module may generate spectral representations of the sound as an intermediate step, i.e. before generating the audio data, these spectral representations may be sent directly to the machine-learned model 332 of the rig parameter generator 330 without undergoing processing by the audio transformer 320.

Prediction Neural Network Structure

Figure 4:
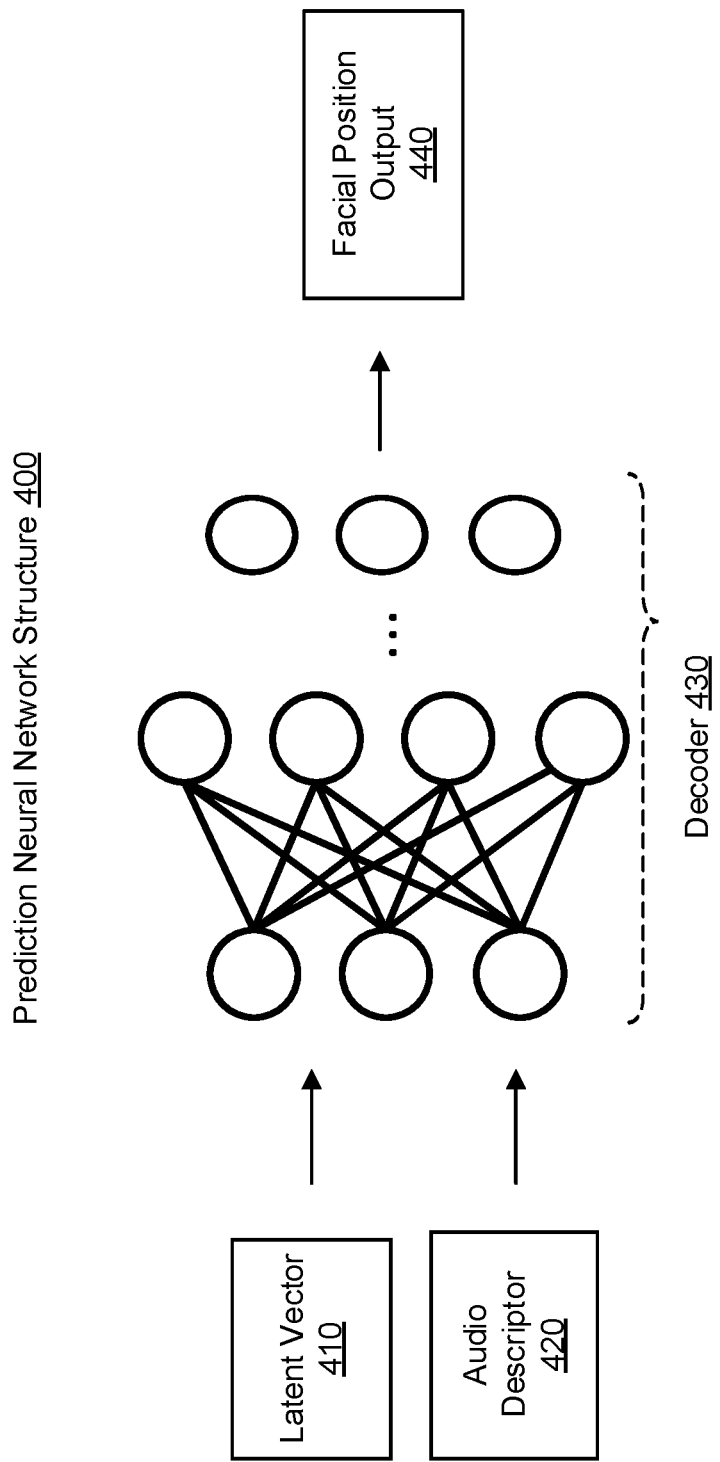
FIG. 4 illustrates an example neural network structure for prediction of a facial position output based on audio data.

Referring to FIG. 4, an example neural network structure 400 for inference of a facial position output based on audio data is illustrated.

In the prediction neural network structure, the decoder 430 receives a latent vector 410 and an audio descriptor 420. Based on the latent vector and the audio descriptor, the decoder outputs a facial position output 440.

The latent vector 410 may take any of the forms described above and may be generated, input or retrieved according to any of the previously described methods and/or with any of the previously described systems.

The audio descriptor 420 is representative of audio data associated with a time step. The audio data associated with the time step may be a window of speech audio. The audio descriptor 420 may include a spectral representation of the audio data, e.g. any of the spectral representations of audio data described above. For example, the spectral representation of the audio data may include a plurality of mel-frequency cepstral coefficients. Alternatively or additionally, the audio descriptor may include one or more representations of the audio data produced by a neural network, e.g. any of the representations of audio data derived using an audio processing neural network described above. For example, the representation of audio data may be the output of an encoder of a vector quantized variational autoencoder for the audio data associated with the time step.

The decoder 430 receives the latent vector 410 and audio descriptor 420. The decoder may also receive additional descriptors and/or parameters, e.g. an actor descriptor. The decoder 430 may receive the latent vector at a first neural network layer of the decoder and may receive the audio descriptor at one or more subsequent layers. Any additional descriptors and/or parameters may be received at either of these layers, e.g. by being concatenated with the latent vector or audio descriptor, or may be receive at another neural network layer of the decoder. Alternatively, the decoder 430 may receive these as a vector including a concatenation of the latent vector 410 and audio descriptor 420. The decoder 430 may include a number of neural network layers. The neural network layers of the decoder may be feed-forward layers, convolutional neural network layers and/or recurrent neural network layers. The decoder 430 may be a decoder of a trained conditional variational neural network or may be a generator of a trained conditional generative adversarial network. The decoder 430 processes the received input and outputs the facial position output 440 or data that may be transformed in to the facial position output 440. The decoder may have the structure described in relation to step 140 of FIG. 1.

The facial position output 440 may include one or more rig parameters for positioning a skeleton of a three-dimensional facial model. The one or more rig parameters may describe the positions and/or orientations of interconnected bones forming the skeleton of the three-dimensional facial model. The facial position output may also take other forms. For example, the facial position output 440 may include a plurality of vertex positions of the three-dimensional facial model. The plurality of vertex positions may be received as vertex coordinates or as displacements of the vertices from their positions in a template facial mesh.

Training Neural Network Structure

Figure 5:
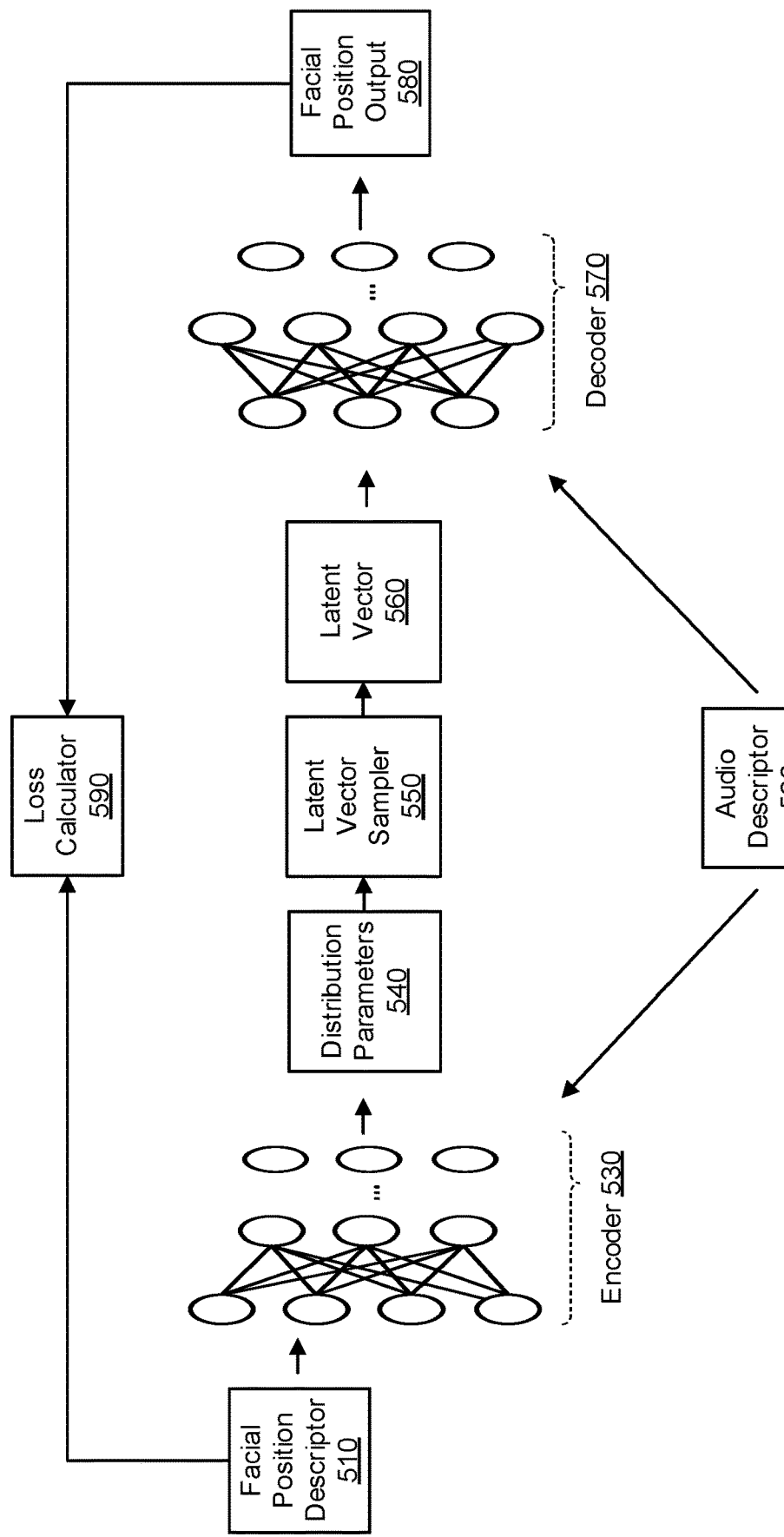
FIG. 5 illustrates an example neural network structure for training a machine-learned model to generate facial position based on audio data.

Referring to FIG. 5, an example neural network structure 500 for training a machine-learned model to generate facial position based on audio data.

The neural network includes an encoder 530, distribution parameters 540, a latent vector sample 550, a latent vector 560 and a decoder 570.

The encoder 530 receives a facial position descriptor 510 and an audio descriptor 520. The encoder 530 may receive the facial position descriptor 510 at a first neural network layer of the encoder and may receive the audio descriptor 520 at one or more subsequent layers. Alternatively, the encoder 530 may receive these as a vector including a concatenation of the facial position descriptor 510 and audio descriptor 520. Based on the facial position descriptor 510 and the audio descriptor 520, the encoder outputs distribution parameters 540. The encoder 530 may also receive additional descriptors and/or parameters, e.g. an actor descriptor.

The facial position descriptor 510 may include one or more rig parameters for positioning a skeleton of a three-dimensional model. The one or more rig parameters may describe the positions and/or orientations of interconnected bones forming the skeleton of the three-dimensional facial model. The facial position output may also take other forms. For example, the facial position descriptor 510 may include a plurality of vertex positions of the three-dimensional facial model. The plurality of vertex positions may be received as vertex coordinates or as displacements of the vertices from their positions in a template facial mesh.

The audio descriptor 520 is representative of audio data associated with a time step. The audio data associated with the time step may be a window of speech audio. The audio descriptor may take the same form and/or include any of the elements described in relation to audio descriptor 420.

The encoder 530 includes a plurality of neural network layers. The neural network layers of the encoder may be feed-forward layers. Feed-forward layers may use fewer computational resources and/or process the training data items faster than other types of neural network layers. However, in some embodiments, other types of neural network layers may alternatively or additionally be used such as recurrent layers and/or convolutional layers. The encoder may have the structure described in relation to step 120 of FIG. 1.

The distribution parameters 540 output by the encoder may be latent space distribution parameters. The distribution parameters 540 may include a location vector, i.e. a mean vector; and a standard deviation or variance vector. Alternatively or additionally, the latent space distribution parameters may include a covariance matrix, Dirichlet distribution concentration parameters and/or a degree of freedom parameter.

The latent vector sampler 550 receives the distribution parameters 540 and based on them sample a latent vector 560, z, from a latent space distribution. Where the distribution parameters 540 include a location vector, μ, and a variance vector, $\sigma^2$, the latent space distribution may be a multivariate Gaussian distribution having a location defined by the location vector and a diagonal covariance matrix, $\Sigma_d$, with a diagonal of the variance vector, $\sigma^2$:

$$z \sim \mathcal{N}(\mu, \Sigma_d)$$

Where the distribution parameters 540 include a location vector, μ, and a covariance matrix, Σ, the latent space distribution may be a multivariate Gaussian distribution having a location defined by the location vector and a covariance defined by the covariance matrix:

$$z \sim \mathcal{N}(\mu, \Sigma)$$

Other latent space distributions may alternatively be used. The distribution parameters 540 may include a degree of freedom parameter, ν, and the latent space distribution may be a multi-variate t-distribution parameterized with either a variance vector or covariance matrix:

$$z \sim t_\nu(\mu, \Sigma_d) \text{ or } z \sim t_\nu(\mu, \Sigma)$$

Alternatively, the latent space distribution parameters may be a vector, a, of positive real numbers known as concentration parameters, and the latent space distribution may be a Dirichlet distribution:

$$z \sim \text{Dir}(\alpha)$$

Where a multivariate Gaussian distribution is used, the latent vector 560, z, may be sampled by sampling a (pseudo-)randomly distributed vector, ε, from the zero-mean, unit-variance multi-variate Gaussian distribution, $\mathcal{N}(0, \mathbb{1})$, and using this to calculate a value for the latent vector, z, using latent space distribution parameters:

$$z = \mu + \sigma\varepsilon \text{ where } \varepsilon \sim \mathcal{N}(0, \mathbb{1})$$

where μ is the location vector and σ is the standard deviation vector. Alternatively, where a covariance matrix, Σ, is used, a value for the latent vector may be calculated as $$z = \mu + \Sigma^{\frac{1}{2}} \varepsilon$$

where $$\Sigma^{\frac{1}{2}}$$

is the Cholesky decomposition or the covariance matrix.

This technique is known as the reparametization trick. A benefit of the reparametization trick is that the stochastic element is the (pseudo-)randomly distributed vector, ε, and, therefore, during training of the network, the distribution parameters 540, e.g. μ and σ, may be backpropagated through.

The decoder 570 receives the latent vector 560 and the audio descriptor 570. Based on the latent vector 560 and the audio descriptor 520, the encoder outputs facial position outputs 580.

The decoder 570 may receive, at a first layer, the latent vector 560. The decoder 570 may receive the audio descriptor 520 at one or more subsequent layers. Alternatively, the decoder 570 may receive these as a vector including a concatenation of the latent vector 560 and audio descriptor 520. The decoder 570 may have any of the structures described in relation to decoder 430. The decoder 570 may have the same number of neural network layers as the encoder 530. Aspects of the decoder 570 and encoder 530 may correspond. For example, the output layer of the decoder 570 may be the same size as the input layer of the encoder 530; the second to last layer of the decoder 570 may be the same size as the second layer of the encoder 530; and/or the input layer of the decoder 570 may be the same size as the output layer of the encoder 530, etc.

The facial position output 580 may take any of the forms and/or include any of the same elements as facial position output 440. The facial position output 580 may take the same form as the facial position descriptor 510.

The loss calculator 590 calculates a loss value based on the facial position descriptor 510 and the facial position output 580.

The loss calculator 590 may calculate the loss value using a loss function including a reconstruction error term and a regularization term. The loss calculator 590 may calculate 590 the loss value individually for corresponding facial position descriptors 510 and facial position outputs 580. Alternatively, the loss calculator 590 may calculate the loss value as a mean or sum over a plurality of corresponding facial position descriptors 510 and facial position outputs 580.

The reconstruction error term may be based on the mean squared error between the facial position output 580 and the facial position descriptor 510. Alternatively or additionally, the reconstruction error term may be based on other measures of reconstruction error such as mean absolute error or root mean squared error.

The regularization term may be based on a Kullback-Leibler divergence between an estimated posterior distribution of the latent vector 560, i.e. the latent space distribution determined by the encoder 530 based on the facial position descriptor 510 and the audio descriptor 520, and a prior distribution for the latent vector 560. As described previously, the estimated posterior distribution may be a multi-variate Gaussian distribution, $\mathcal{N}(\mu, \Sigma)$, where $\mu$ and $\Sigma$ are parameters derived using the encoder 530. $\Sigma$ may be derived directly by the encoder 530 or a variance vector, $\sigma^2$, or standard deviation vector, $\sigma$, may be derived using the encoder 530, and the covariance matrix, $\Sigma$ defined as a diagonal covariance matrix with a diagonal of the, variance vector, $\sigma^2$.

The prior distribution of the latent vector 560 may be a zero-mean unit variance multivariate Gaussian distribution, $\mathcal{N}(0, \mathbb{I})$. The estimated posterior distribution of the latent vector 560 may be denoted as $Q(z|x, s)$ where z is the latent vector, x is a facial position descriptor vector and s is the audio descriptor 520 or a vector representation thereof. The estimated posterior distribution may be conditioned on additional input parameters and/or descriptors, e.g. an actor descriptor. If the additional input parameters are denoted as a vector, c, the estimated posterior distribution of the latent vector can be denoted as $Q(z|x, s, c)$. The prior distribution of the latent vector 560 may be denoted as $P(z)$. Where the estimated posterior and prior distributions are the described multi-variate Gaussians, the Kullbeck-Leibler divergence between these, $\mathcal{D}(Q(z|x, s)\|P(z))$, may be calculated as:

$$\mathcal{D}_{(Q(z|x,s)\|P(z))} = \mathcal{D}(\mathcal{N}_{(\mu,\Sigma)}\|\mathcal{N}_{(0,\mathbb{I})}) = \frac{1}{2}(tr(\Sigma) + \mu^T\mu - k - \log|\Sigma|)$$

where k is the dimensionality of z, i.e. the number of elements in the latent vector 560.

Additional terms may be included in the loss function. For example, the loss function may include additional regularization terms may be included such as an L2 regularization term and/or an L1 regularization term.

The parameters of the encoder 530 and decoder 570, e.g. their neural network weights and biases, may be updated based on the loss value calculated using the loss calculator 590. The updates to the parameters may be calculated using backpropagation. In backpropagation, the calculated loss value, or a value derived from it, are backpropagated through the network to calculate derivatives of the loss with respect to a given network parameter of the encoder 530 or decoder 570. The parameters of the autoencoder may then be updated by gradient descent using the calculated derivatives. As discussed above, the 'reparametization trick' may facilitate the use of gradient descent to train the encoder 530 and decoder 570. With the reparametization trick, the latent vector sampler 550 may be backpropagated through to the encoder 530 via distribution parameters 540, with the stochastic element contained in the sampled vector, ε.

The systems and methods described above may improve the quality of facial animations automatically generated based on audio data, e.g. voice audio, compared with existing systems. Furthermore, these systems and methods may reduce the computational resources used to train systems for generating facial animations of an acceptable quality based on audio data. The trained systems may use fewer computational resources to generate facial animations based on audio data than existing systems. The use of fewer computational resources may facilitate the generation of facial animation based on user speech in real time.

The described systems and methods are particularly advantageous in the context of video games. Many video games include characters represented using three-dimensional models and, during gameplay and/or cut scenes, these characters may speak extensively. Therefore, for high quality animation of these characters, the face of the three-dimensional model is animated realistically in correspondence with the sound. With the described systems and methods, these animations may be automatically generated based on the characters speech audio. In embodiments of the described systems and methods usable for real-time animation, facial animations may also be produced based on user speech during gameplay. For example, in existing online games user speech is often disembodied, these embodiments may facilitate animating the face of the user's character based on their speech in online games. Therefore, the immersion of the user and other's viewing their character in online games may be heightened.

In the above description, numerous details are set forth. It will be apparent, however, to one of ordinary skill in the art having the benefit of this disclosure that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulation of physical quantities. Usually, though not necessarily, these quantities take the form of electrical or magnetic signals capable of being stored, transferred, combined, compared and otherwise manipulated. It has been proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "identifying," "classifying," "reclassifying," "determining," "adding," "analyzing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purpose, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMS and magnetic-optical disks, read-only memories (ROMs), random access memories (RAMs), EPROMs, magnetic or optical cards, flash memory, or any type of media suitable for storing electronics instructions.

The words "example" or "exemplary" are used herein to mean serving as an example, instance, or illustration. Any aspect or design described herein as "example" or "exemplary" is not necessarily to be construed as preferred or advantageous over other aspects of designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" in intended to mean any of the natural inclusive permutations. That is, if X includes A; X includes B; or X includes both A and B, then "X includes A and B" is satisfied under any of the foregoing instances. In addition, the articles "a" and "an" as used in this specification and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinary meaning according to their numerical have a ordinal meaning according to their numerical designation.

The algorithms and displays presented herein presented herein are inherently related to any particular computer or other apparatus. Various general purpose systems may be used with programs in accordance with the teachings herein, or it may prove convenient to construct a more specialized apparatus to perform required method steps. The required structure for a variety of these systems will appear from the description. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or method are not described in detail or are presented in simple block diagram format in order to avoid unnecessarily obscuring the present disclosure. Particular implementations may vary from these example details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

The invention claimed is:

1. A computer-implemented method for generating facial animation data based on audio data comprising:
   receiving an audio descriptor representative of audio data associated with a time step;
   receiving a latent vector; and
   processing the latent vector and the audio descriptor using a generative neural network model to output facial animation data, the facial animation data comprising either rig parameters or one or more values used to generate the rig parameters, wherein the rig parameters are configured to position a skeleton of a three-dimensional facial model in accordance with the latent vector and the audio descriptor.

2. The method of claim 1, wherein the one or more values comprises a plurality of vertex positions as vertex coordinates or as displacements of the vertices from their positions in a template facial mesh, and wherein the one or more values are transformed to generate said rig parameters.

3. The method of claim 2, wherein the one or more values are transformed to generate said rig parameters using a linear or non-linear transformation.

4. The method of claim 1, comprising generating the latent vector based on one or more latent vectors associated with one or more time steps prior to the time step associated with the audio data.

5. The method of claim 1, wherein the audio descriptor comprises a spectral representation of the audio data associated with the time step.

6. The method of claim 5, wherein the spectral representation of the audio data comprises a plurality of mel-frequency cepstral coefficients.

7. The method of claim 1, wherein the audio descriptor is an output of an encoder of a vector quantized variational autoencoder for the audio data associated with the time step.

8. The method of claim 1, further comprising:
   receiving one or more facial expression parameters; and
   generating the latent vector based on the one or more facial expression parameters.

9. A system comprising:
   at least one processor; and
   a non-transitory computer-readable medium including executable instructions that when executed by the at least one processor cause the at least one processor to perform at least the following operations:
      receive an audio descriptor representative of audio data associated with a time step;
      receive a latent vector; and
      process the latent vector and the audio descriptor using a generative neural network model to output facial animation data, the facial animation data comprising either rig parameters or one or more values used to generate the rig parameters, wherein the rig parameters are configured to position a skeleton of a three-dimensional facial model in accordance with the latent vector and the audio descriptor.

10. The system of claim 9, wherein the one or more values comprises a plurality of vertex positions as vertex coordinates or as displacements of the vertices from their positions in a template facial mesh, and wherein the one or more values are transformed to generate said rig parameters.

11. The system of claim 10, wherein the one or more values are transformed to generate said rig parameters using a linear or non-linear transformation.

12. The system of claim 9, comprising generating the latent vector based on one or more latent vectors associated with one or more time steps prior to the time step associated with the audio data.

13. The system of claim 9, wherein the audio descriptor comprises a spectral representation of the audio data associated with the time step.

14. A non-transitory computer-readable medium including executable instructions that when executed by one or more processors cause the one or more processors to perform at least the following operations:
    receive an audio descriptor representative of audio data associated with a time step;
    receive a latent vector; and
    process the latent vector and the audio descriptor using a generative neural network model to output facial animation data, the facial animation data comprising either rig parameters or one or more values used to generate the rig parameters, wherein the rig parameters are configured to position a skeleton of a three-dimensional facial model in accordance with the latent vector and the audio descriptor.

15. The computer-readable medium of claim 14, wherein the one or more values comprises a plurality of vertex positions as vertex coordinates or as displacements of the vertices from their positions in a template facial mesh, and wherein the one or more values are transformed to generate said rig parameters.

16. The computer-readable medium of claim 15, wherein the one or more values are transformed to generate said rig parameters using a linear or non-linear transformation.

17. The computer-readable medium of claim 14, comprising generating the latent vector based on one or more latent vectors associated with one or more time steps prior to the time step associated with the audio data.

* * * * *